US009118858B2

(12) United States Patent
Totsuka

(10) Patent No.: US 9,118,858 B2
(45) Date of Patent: Aug. 25, 2015

(54) IMAGE PICKUP APPARATUS, IMAGE PICKUP SYSTEM AND DRIVING METHOD OF IMAGE PICKUP APPARATUS

(71) Applicant: CANON KABUSHIKI KAISHA, Tokyo (JP)

(72) Inventor: Hirofumi Totsuka, Fujisawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 14/147,377

(22) Filed: Jan. 3, 2014

(65) Prior Publication Data
US 2014/0192242 A1    Jul. 10, 2014

(30) Foreign Application Priority Data
Jan. 8, 2013 (JP) .................................. 2013-001081

(51) Int. Cl.
*H04N 5/3745* (2011.01)
*H04N 5/347* (2011.01)

(52) U.S. Cl.
CPC ............ *H04N 5/3745* (2013.01); *H04N 5/347* (2013.01)

(58) Field of Classification Search
CPC .. H04N 5/37457; H04N 5/347; H04N 5/3745
See application file for complete search history.

(56) References Cited

U.S. PATENT DOCUMENTS

| 2003/0010896 A1* | 1/2003 | Kaifu et al. ................. 250/208.1 |
| 2010/0051784 A1* | 3/2010 | Parks .......................... 250/208.1 |
| 2011/0128425 A1* | 6/2011 | Schemmann et al. ........ 348/300 |

FOREIGN PATENT DOCUMENTS

| JP | 2003-018465 A | 1/2003 |
| JP | 2009-016972 A | 1/2009 |
| JP | 2010-103437 A | 5/2010 |
| JP | 2010-239317 A | 10/2010 |

* cited by examiner

*Primary Examiner* — Paul Berardesca
(74) *Attorney, Agent, or Firm* — Canon USA, Inc. IP Division

(57) ABSTRACT

An image pickup apparatus of an embodiment includes pixel units each including a photoelectric conversion unit and an amplification transistor that outputs a signal based on an electric carrier generated by the photoelectric conversion unit, a first output line to which signals from first and other pixel units are output, and a second output line to which signals from second and other pixel units are output. A connection unit is arranged to control an electric connection between input nodes of the amplification transistors of the first and second pixel units is arranged. A control unit is arranged to selectively output a signal from at least one of the first and second pixel units to the first output line out of the first and second output lines when the connection unit mutually connects the input nodes of the first and second pixel units.

12 Claims, 7 Drawing Sheets

IMAGE PICKUP APPARATUS, IMAGE PICKUP SYSTEM AND DRIVING METHOD OF IMAGE PICKUP APPARATUS

BACKGROUND OF THE INVENTION

1. Field of the Invention

One disclosed aspect of the embodiments relates to an image pickup apparatus, an image pickup system and a driving method of the image pickup apparatus.

2. Description of the Related Art

There is suggested an image pickup apparatus that has a connection unit for mutual connection or non-connection of input nodes of amplification transistors of a plurality of pixels. FIG. 8 of Japanese Patent Laid-Open No. 2010-103437 describes an image pickup apparatus that has a connection transistor for connection or non-connection of a plurality of floating diffusion regions. FIG. 9 of Japanese Patent Laid-Open No. 2009-016972 describes an image pickup apparatus that has a reset switch for common connection of floating diffusions of a plurality of pixels in the identical pixel block. The image pickup apparatuses described in these patent literatures are configured such that signals of a plurality of pixels are output to different output lines, in a case where the connection transistor or the reset switch is turned off, that is, in a case where a plurality of floating diffusions is not mutually connected.

SUMMARY OF THE INVENTION

An image pickup apparatus corresponding to an embodiment according to one aspect of the embodiments includes: a plurality of pixel units each including a photoelectric conversion unit and an amplification transistor that outputs a signal based on an electric carrier generated by the photoelectric conversion unit; a first output line to which a signal from two or more pixel units, including a first pixel unit, among the plurality of pixel units is output; a second output line to which a signal from two or more pixel units, including a second pixel unit, among the plurality of pixel units is output; a connection unit configured to control an electric connection between an input node of the amplification transistor included in the first pixel unit and an input node of the amplification transistor included in the second pixel unit; and a control unit configured to selectively output a signal from at least one of the first pixel unit and the second pixel unit to the first output line out of the first output line and the second output line, in a case where the connection unit mutually connects the input node of the first pixel unit and the input node of the second pixel unit.

A driving method of an image pickup apparatus corresponding to an embodiment according to another aspect of the embodiments, in which the image pickup apparatus includes: a plurality of pixel units each including a photoelectric conversion unit and an amplification transistor that outputs a signal based on an electric carrier generated by the photoelectric conversion unit; a first output line to which a signal from two or more pixel units, including a first pixel unit, among the plurality of pixel units is output; a second output line to which a signal from two or more pixel units, including a second pixel unit, among the plurality of pixel units is output; and a connection unit configured to control an electric connection between an input node of the amplification transistor included in the first pixel unit and an input node of the amplification transistor included in the second pixel; and the driving method includes: a first output step of selectively outputting a signal from at least one of the first pixel unit and the second pixel unit to the first output line out of the first output line and the second output line, in a case where the connection unit mutually and electrically connects the plurality of input nodes; and a second output step of outputting a signal from the first pixel unit to the first output line and outputting a signal from the second pixel unit to the second output line, in a case where the connection unit blocks the electric connection of the plurality of input nodes.

Further features of the disclosure will become apparent from the following description of exemplary embodiments (with reference to the attached drawings).

DESCRIPTION OF THE EMBODIMENTS

Figure 1:
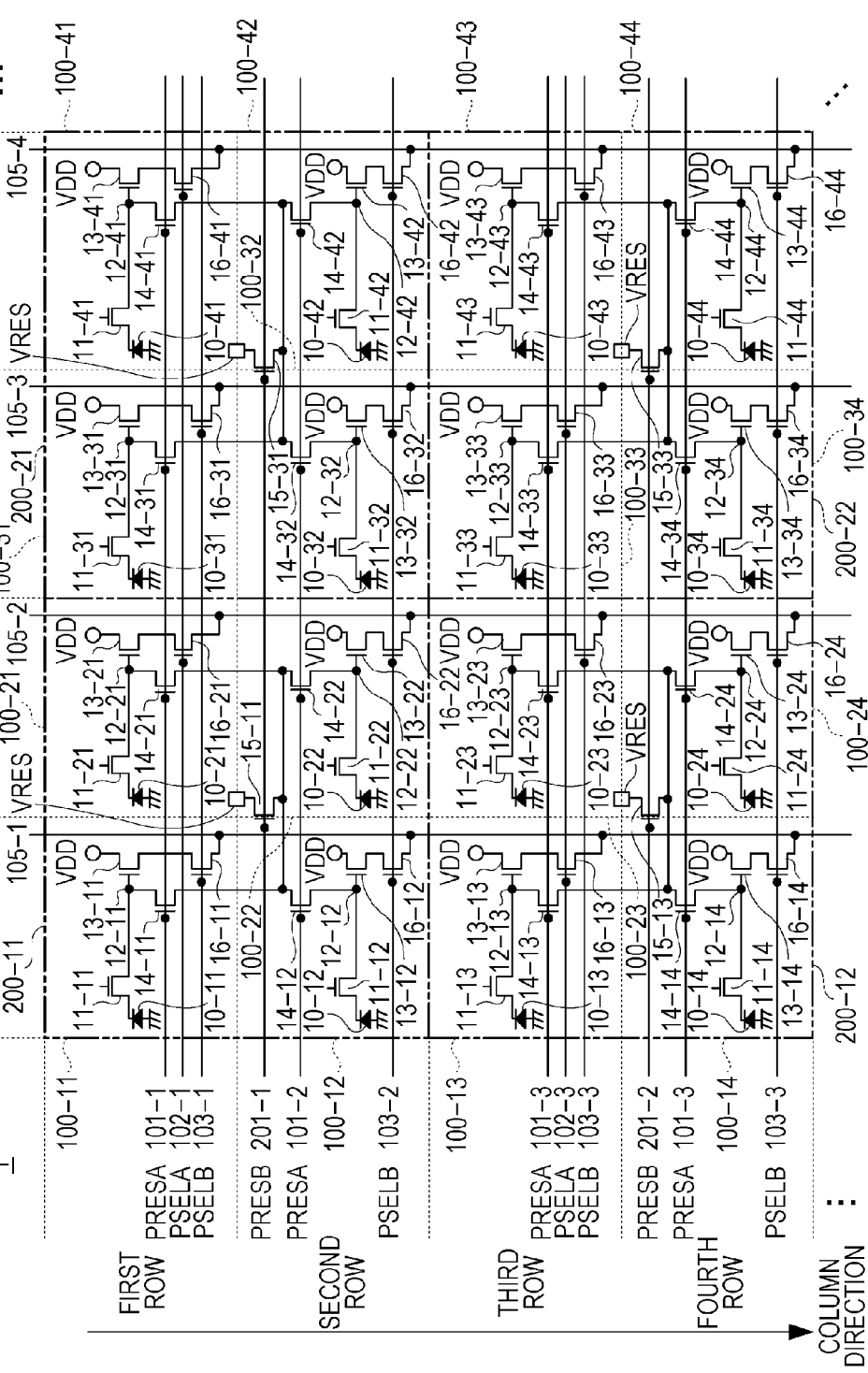
FIG. 1 is a view illustrating an equivalent circuit of an image pickup apparatus of an embodiment.

According to some embodiments, it is possible to read out signals at high speed or reduce the power consumption. Alternatively, according to some embodiments, it is possible to achieve both the speed-up of the reading of signals and the low power consumption. One disclosed feature of the embodiments may be described as a process which is usually depicted as a timing diagram. A timing diagram may illustrate the timing relationships of several entities, such as signals, events, etc. Although a timing diagram may describe the operations as a sequential process, some operations may be performed in parallel or concurrently. In addition, unless specifically stated, the order of the operations or timing instants may be re-arranged. Furthermore, the timing or temporal distances may not be scaled or depict the timing relationships in exact proportions.

In an image pickup apparatus, it is requested to read out signals from pixels at higher speed. In an image pickup apparatus known to the inventor, when the floating diffusions of a plurality of pixels are mutually connected, the same signal is output to a plurality of output lines. The present inventor found that it was possible to perform the reading of signals from pixels in a shorter time in such an image pickup apparatus.

Moreover, the image pickup apparatus is requested to have low power consumption. The present inventor found that it is possible to reduce the power consumption in an image pickup apparatus known to the inventor.

In view of such challenges, some embodiments enable the reading of signals at high speed, the reduction of power consumption, or both the speed-up of the reading of signals and the low power consumption in an image pickup apparatus that has a connection unit for mutual connection or non-connection of input nodes of amplification transistors of a plurality of pixels.

One embodiment is directed to an image pickup apparatus that has a plurality of pixel units. One pixel unit includes at least one photoelectric conversion unit and an amplification transistor corresponding thereto. A plurality of pixel units includes a first pixel unit and a second pixel unit. A signal from the first pixel unit is output to at least a first output line. A signal from the second pixel unit is output to at least a second output line. The signals from the pixel units denote signals including at least elements based on electric carriers generated by the photoelectric conversion units included in the pixels.

The image pickup apparatus according to some embodiments has a connection unit that controls electric connection between an input node of the amplification transistor of the first pixel unit and an input node of the amplification transistor of the second pixel unit. In a case where the connection unit mutually connects the input nodes of the amplification transistors of two pixel units, signals of two pixel units may be added. In this case, the addition signal of two signals may be output from an amplification transistor. A signal averaging a plurality of signals is one specific example of the addition signal. The addition signal is one specific example of the signal from at least one of two pixel units. This is because the addition signal varies on the basis of an electric carrier generated by either one of the photoelectric conversion units.

Here, even when the connection unit mutually connects the input nodes of the amplification transistors of two pixel units, by transferring only the electric carrier of the photoelectric conversion unit of one pixel unit to the input node of the amplification transistor, it is possible to output only the signal from the pixel unit. By mutually connecting a plurality of input nodes, it is possible to increase the capacity of the input nodes. Therefore, by reading out only the electric carrier of the photoelectric conversion unit of one pixel unit, for example, in a case where the amount of electric carriers generated by the photoelectric conversion unit is large because of the incidence of very strong light, it is possible to reduce the possibility that the signal is saturated in a subsequent circuit.

The image pickup apparatus according to some embodiments has a control unit that selectively outputs a signal to either one of a first output line and a second output line, in a case where a connection unit mutually connects a plurality of input nodes. For example, when the connection unit mutually connects the input nodes of the first and second pixel units, the control unit outputs a signal from at least one of the first and second pixel units to the first output line and blocks the output of signals from the first and second pixel units to the second output line. In this case, the voltage or current of the first output line, that is, the signal value varies according to the voltage or current of the input node of the amplification transistor included in the first pixel unit. Meanwhile, the signal value of the second output line may be decided on the basis of the output of a transistor different from the amplification transistors included in the first and second pixel units or the output of a circuit different from the first and second pixel units. Simply, the second output line may be an electric floating.

To be more specific, in some embodiments, switches are arranged in series in an electric path from a power source to the first output line through the transistor of the first pixel unit and an electric path from the power source to the second output line through the transistor of the second pixel unit. In such embodiments, signals are output by turning on the switches. The signals are blocked by turning off the switches.

In some embodiments, a connection unit mutually connects a plurality of input nodes, and, after the connection is terminated, a control unit selectively outputs a signal to one output line. This driving may be performed in the embodiments formed such that the switches in series with the above-mentioned amplification transistors are not installed and the signal output is controlled by the bias of the amplification transistors. In such embodiments, for example, after the connection unit terminates the connection, the control unit supplies a voltage to cause one amplification transistor to be in an inactive state, to the input node of the amplification transistor. Alternatively, after the connection unit terminates the connection, the control unit supplies a voltage to cause one amplification transistor to be in an inactive state, to a main node of the amplification transistor. Thus, the bias states of the amplification transistors of two pixel units are independently controlled.

Here, in some embodiments, there is a parasitic capacity between an input node of an amplification transistor and an output line. In such a case, even when the output of a signal to the second output line is blocked, the signal value of the second output line varies according to the voltage or current of the input node of the amplification transistor included in the first or second pixel unit, through coupling capacitance. Thus, in the blocking of the output of a signal to the second output line, the correlation between an input node and an output node does not have to be necessarily adjusted to 0, and both of them may have correlation with each other.

In an embodiment, in a case where a connection unit mutually connects a plurality of input nodes, a signal is selectively output to a part of a plurality of output lines. According to such a configuration, it is possible to output another signal to the remaining output lines in parallel. Therefore, it is possible to speed up the reading of signals. Alternatively, according to such a configuration, it is possible to reduce the power consumption since a signal is not output to the remaining output lines.

In the following, the embodiments are described in detail with reference to the drawings. The disclosure is not limited to only the embodiments described in the following. A variation, in which a configuration of the embodiments described in the following is partially modified within a range not exceeding the spirit of the disclosure, is also an embodiment of the disclosure. Moreover, an example in which the configuration of one of the following embodiments is partially added to another embodiment or an example in which the configuration is partially replaced with that of another embodiment is also an embodiment of the disclosure.

Embodiment 1

FIG. 1 is a view illustrating an equivalent circuit of an image pickup apparatus of some embodiments. An image pickup apparatus 1 has a plurality of pixel units 100 arranged in an image pickup region. The plurality of pixel units 100 is arranged so as to form a matrix including a plurality of rows and a plurality of columns. One row includes the plurality of pixel units 100 in which signals are read out in parallel. One column includes the plurality of pixel units 100 connected to a same output line 105. FIG. 1 illustrates 16 pixel units 100. In the image pickup apparatus 1 of some embodiments, more pixel units may be arranged. Here, in other embodiments, the plurality of pixel units 100 is arranged at random.

In a case where there is a notation of two-digit figures following a hyphen such as "pixel unit 100-11," it is assumed that the figures following the hyphen show the addresses of the row and the column. For example, in the case of a pixel unit 100-12, it denotes a pixel unit arranged in the second row of the first column. A photoelectric conversion unit 10-12 denotes a photoelectric conversion unit included in the pixel unit 100-12. Moreover, in a case where there is a notation of a single-digit figure following a hyphen, it is assumed that the figure following the hyphen shows the address of the row or column. For example, in the case of a first selection control signal PSELA 103-2, it shows a first selection control signal corresponding to the pixel unit 100 of the second row, and, in the case of an output line 105-3, it shows an output line electrically connected to the pixel unit 100 included in the third column.

A pixel unit 100 includes at least a photoelectric conversion unit 10 and an amplification transistor 13. The photoelectric conversion unit 10 is, for example, a photodiode. The amplification transistor 13 is electrically connected to the output line 105. Subsequently, the amplification transistor 13 outputs a signal based on an electric carrier generated by the photoelectric conversion unit 10 to the output line 105. The amplification transistor 13 and a current source, which is electrically connected to the output line 105 and is not illustrated, form a source follower circuit. In other embodiments, the amplification transistor 13 may form a differential amplification amplifier and a source-grounded amplification circuit. The amplification transistor 13 may include an MOS transistor and a JFET. A signal output to the output line 105 is transmitted to a subsequent column circuit which is not illustrated. In the column circuit, signal processing such as amplification, noise reduction and AD conversion is performed.

In some embodiments, a transfer transistor 11 is arranged between the photoelectric conversion unit 10 and an input node 12 of the amplification transistor 13. The transfer transistor 11 transfers an electric carrier generated by the photoelectric conversion unit 10 to the input node 12 of the amplification transistor 13. In this case, for example, the input node 12 of the amplification transistor 13 may be a node configured to include a floating diffusion region, for example. In some embodiments, the transfer transistor 11 is not arranged. In this case, the photoelectric conversion unit 10 is directly connected to the input node 12 of the amplification transistor 13. That is, the input node 12 of the amplification transistor 13 is configured to include a semiconductor region forming the photoelectric conversion unit 10.

The input node 12 of the amplification transistor is electrically connected to the input node 12 of another amplification transistor 13 through a connection transistor 14. By turning on the connection transistor 14, the two input nodes 12 become conductive. By turning off the connection transistor 14, the two input nodes 12 become non-conductive. That is, the connection transistor 14 is included in a connection unit that controls electric connection between the input nodes 12 of the amplification transistors 13 included in the plurality of pixel units 100. Also, in some embodiments, by connecting the plurality of input nodes 12 by the connection unit, signals of a plurality of pixel units are added or averaged.

The connection unit mutually and electrically connects the input nodes 12 of the amplification transistors 13 of the plurality of pixel units 100 connected with respective output lines 105. For example, in an embodiment illustrated in FIG. 1, the connection unit may mutually connect the plurality of input nodes 12 in the combination of pixel units having two rows and two columns enclosed with a dotted line 200. In some of other embodiments, the connection unit mutually connects the plurality of input nodes 12 in the combination of pixel units having one row and two columns. Besides this, various combinations such as combination of two rows and three columns and combination of three rows and three columns are possible. Moreover, in an embodiment in which the plurality of pixel units 100 is not arranged in a matrix manner, combination that cannot be expressed by a row and column is also possible.

Moreover, in the embodiment illustrated in FIG. 1, the connection transistor 14 is arranged in each of the plurality of pixel units 100. In some of other embodiments, n−1 (n represents a natural number) items of connection transistors 14 are arranged in n pixel units 100. In this case, since it is possible to reduce the number of transistors, the area of the photoelectric conversion unit can be enlarged.

The input node 12 of the amplification transistor 13 is electrically connected to one of two main nodes of a reset transistor 15 through the corresponding connection transistor 14. The other of the two main nodes of the reset transistor 15 is electrically connected to a wiring that supplies a voltage to reset the voltage of the input node 12. With such a configuration, it is possible to supply the voltage for reset from the wiring that supplies the voltage, to each of the input nodes 12 through the reset transistor 15 and the connection transistor 14.

In the embodiment illustrated in FIG. 1, each of the input nodes 12 is electrically connected to the reset transistor 15 through the connection transistor 14. According to such a configuration, it is possible to set the capacity of the input nodes 12 to mutually close values or an equal value. As a result, it is possible to reduce the fixed-pattern noise in these embodiments. In some of other embodiments, the reset transistor 15 may be directly connected to one of the input nodes 12.

An output node of the amplification transistor 13 is electrically connected to the output line 105 through a selection transistor 16. By turning on the selection transistor 16, it outputs a signal from the corresponding amplification transistor 13 to the output line 105. Moreover, by turning off the selection transistor 16, it blocks the output of a signal from the corresponding amplification transistor 13 to the output line 105. Therefore, by combination of turning on and off a plurality of selection transistors 16, from the plurality of amplification transistors 13, the one to output a signal is selected. That is, in some embodiments, the plurality of selection transistors 16 forms the control unit. Here, the selection transistor 16 may be arranged in series in an electric path between a power source node and the amplification transistor 13.

The control node of each transistor is electrically connected to a control line. Here, a description is given using four pixel units 100-11, 100-12, 100-21 and 100-22 enclosed with a dotted line 200-11 as an example. First, connection transistors 14-11 and 14-21 are electrically connected to a connection control line 101-1. Connection transistors 14-12 and 14-22 are electrically connected to a connection control line 101-2. Next, a selection transistor 16-21 is electrically connected to a first selection control line 102-1. The selection transistor 16-11 is electrically connected to a second selection control line 103-1. Subsequently, the selection transistor 16-12 and the selection transistor 16-22 are electrically connected to a third selection control line 103-2. A reset transistor 15-11 is electrically connected to a reset control line 201-1. The control node of the transistor of another pixel unit 100 is connected to the corresponding control line as illustrated in FIG. 1. In some embodiments, a scanning circuit which is not illustrated supplies a driving signal to the control line. In other embodiments, the drive signal may be supplied from the outside of the image pickup apparatus.

In the embodiment illustrated in FIG. 1, a control node of the selection transistor 16-11 and a control node of the selection transistor 16-21 are connected to different control lines. That is, the selection transistor 16-11 and the selection transistor 16-21 are controlled independently from each other. In another respect, two selection control lines are arranged to the selection transistors included in two pixel units arranged in the same row. With such a configuration, when the connection unit connects the input node 12-11 of the amplification transistor 13-11 and the input node 12-21 of the amplification transistor 13-21, the control unit selectively outputs a signal from at least one of the pixel unit 100-11 and the pixel unit 100-21 to either one of the output line 105-1 and the output line 105-2.

To be more specific, when the connection unit connects four input nodes 12-11, 12-21, 12-12 and 12-22, the selection transistor 16-11 is turned on and the selection transistors 16-21, 16-12 and 16-22 are turned off. By this means, a signal from one of four pixel units 100-11, 100-21, 100-12 and 100-22 or their addition signal is output to the output line 105-1. Meanwhile, the output of signals from the pixel unit 100-21 (or 100-11, 100-12 or 100-22) to the output line 105-2 is blocked. Alternatively, the selection transistor 16-21 may be turned on and the selection transistors 16-11, 16-12 and 16-22 may be turned off. By this means, the signal from one of four pixel units 100-11, 100-21, 100-12 and 100-22 or their addition signal is output to the output line 105-2. Meanwhile, the output of signals to the output line 105-1 is blocked.

It is possible to output a signal from a pixel unit, which is different from four pixel units 100-11, 100-21, 100-12 and 100-22, to one of the output line 105-1 and the output line 105-2, that is, the output line 105 in which the output of signals is blocked. Therefore, it is possible to output signals to two output lines 105-1 and 105-2 in parallel. As a result, it is possible to read out signals at high speed in these embodiments.

For example, in a case where the output of signals from four pixel units 100-11, 100-21, 100-12 and 100-22 to the output line 105-2 is blocked, a signal from the pixel unit 100-23 is output to the output line 105-2 by turning on the selection transistor 16-23. In some embodiments, the selection transistors 16-13 and 16-23 respectively corresponding to pixel units 100-13 and 100-23 are controlled independently from each other. Therefore, when the connection unit connects the input node 12-13 and the input node 12-23, a signal from at least one of the pixel unit 100-13 and the pixel unit 100-23 may be selectively output to the output line 105-2 out of the output line 105-1 and the output lines 105-2. According to such a configuration, an addition signal from four pixel units 100-11, 100-21, 100-12 and 100-22 enclosed with the dotted line 200-11 and an addition signal from four pixel units 100-13, 100-23, 100-14 and 100-24 enclosed with a dotted line 200-12 can be read out in parallel. As a result, it is possible to read out signals at high speed in these embodiments.

Here, in a case where the connection unit makes the input nodes 12-11, 12-12, 12-21 and 12-22 non-conductive, by turning on both of the selection transistors 16-11 and 16-21, signals are respectively output from the pixel units 100-11 and 100-21 to the output lines 105-1 and 105-2 in parallel. According to the embodiment of such a configuration, it is possible to acquire images of high-resolution.

Moreover, in the embodiment illustrated in FIG. 1, a selection transistor 16-2 corresponding to the pixel unit of the second row is electrically connected to the common third selection control line 103-2. Since it is possible to reduce the number of wirings using such a configuration, the aperture of the photoelectric conversion unit can be enlarged.

By contrast with this, in some other embodiments, the selection transistor 16-12 corresponding to the pixel unit 100-12 and the selection transistor 16-22 corresponding to the pixel unit 100-22 can be controlled independently from each other. That is, the selection transistor 16-12 and the selection transistor 16-22 may be connected to different control lines. In such embodiments, when the connection unit mutually connects the input nodes of the amplification transistors 13 included in the pixel units 100 of the second row, a signal may be selectively output to one of the plurality of output lines 105-1 and 105-2. As a result, it is possible to read out signals at high speed in these embodiments. Alternatively, it may be possible to uniform the size of wiring apertures in the plurality of pixel units 100 by increasing the number of control lines.

In the embodiment illustrated in FIG. 1, the connection transistor 14 is controlled at every row. In such an embodiment, it is possible to perform a reset operation in each row. Alternatively, in such an embodiment, it is possible to select combination of pixels to be added, from combination of two rows and two columns and combination of one row and two columns.

Figure 2:
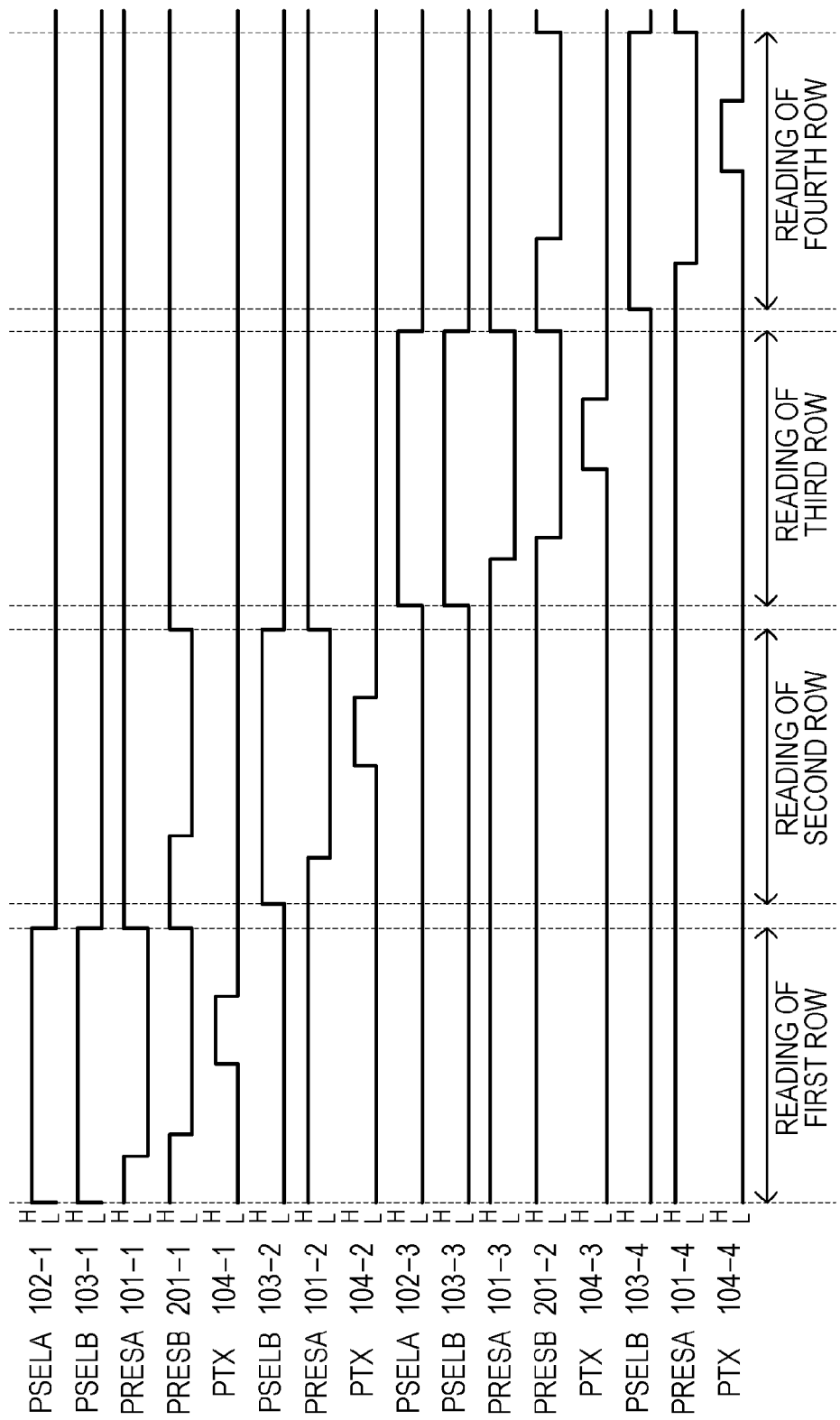
FIG. 2 is a timing chart diagram schematically illustrating the operation of an image pickup apparatus of an embodiment.
Figure 3:
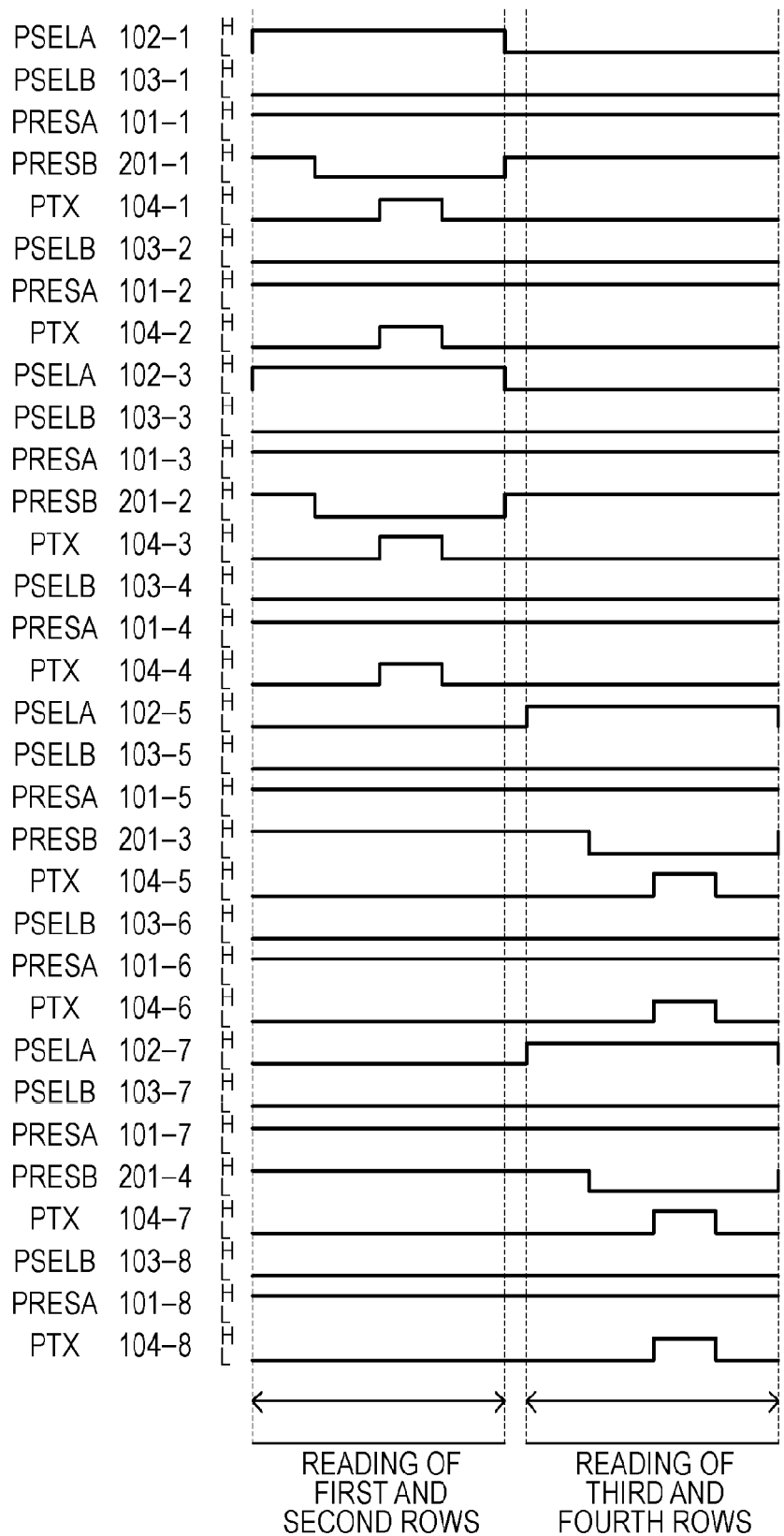
FIG. 3 is a timing chart diagram schematically illustrating the operation of an image pickup apparatus of an embodiment.

Next, an embodiment of a driving method of the image pickup apparatus is described below. FIGS. 2 and 3 are views schematically illustrating a timing chart of drive signals. The drive signals illustrated in FIG. 2 or FIG. 3 are supplied to control lines to which the same reference numerals are assigned in the image pickup apparatus of the embodiment illustrated in FIG. 1. For example, drive signal PSELA is supplied to the first selection control line 102-1. Drive signal PSELB is supplied to the second selection control line 103-1 and the third selection control line 103-2. Drive signal PRESA is supplied to the connection control lines 101-1 and 101-2. Further, drive signal PRESB is supplied to the reset control line 201-1. Moreover, although it is not illustrated in FIG. 1, the transfer transistor 11 is electrically connected to the transfer control line in each row. Further, drive signals PTX 104-1 to PTX 104-4 in FIGS. 2 and 3 are supplied to a transfer control line that is not illustrated. When a drive signal is "High," a relevant transistor is turned on. When a drive signal is "Low," a relevant transistor is turned off. Moreover, a scanning circuit that is not illustrated supplies these drive signals.

The timing chart illustrated in FIG. 2 corresponds to the operation of a first reading mode. First, drive signal PSELA 102-1 and drive signal PSELB 103-1 are set to "High" in a reading period of the pixel unit 100 included in the first line. By this means, the selection transistors 16-11 and 16-21 corresponding to the pixel unit 100 of the first row are turned on.

Next, drive signal PRESA 101-1 is set from "High" to "Low" and drive signal PRESB 201-1 is set from "High" to "Low." By this means, the connection transistors 14-11 and 14-21 and the reset transistor 15-11 are turned off. Since electric connection between wiring VRES that supplies a power source voltage for reset and the input node 12 of the amplification transistor 13 included in the pixel unit 100 of the first row is disconnected, the input node 12 is released from the reset state.

In some embodiments, drive signal PRESA 101 may be set to "Low" before drive signal PRESB 201. By this means, it is possible to suppress the influence of the difference in the timings at which the selection transistor 16-11 and the selection transistor 16-21 become non-conductive, which may be caused by wiring delay or threshold variation of the transistors.

Next, by setting drive signal PTX 104-1 to "High," an electric carrier of the photoelectric conversion unit 10 included in the pixel unit 100 of the first row is transferred to the input node 12. Since the selection transistor 16-11 is turned on, the amplification transistor 13-11 outputs a signal based on an electric carriers generated by a photoelectric conversion unit 10-11 to the output line 105-1. Moreover, since the selection transistor 16-21 is turned on, the amplification transistor 13-21 outputs a signal based on an electric carrier generated by a photoelectric conversion unit 10-21 to the output line 105-2. By setting drive signal PRESA 101-1 and drive signal PRESB 201-1 to "High" after the signal of the output line 105 is transmitted to a subsequent column circuit, the voltage of the input node 12 of the pixel unit 100 of the first row is reset.

Drive signal PSELB 103-2 is set to be "High" in a reading period of the pixel unit 100 included in the second row. By this means, the selection transistor 16 corresponding to the pixel unit 100 of the second row gets in a conductive state. The reset state of a reading node 12 of the second row is cancelled by setting PRESA 101-2 and PRESB 201-1 to "Low" in order, and the electric carrier of the photoelectric conversion unit 10 of the second row is transferred to the reading node 12 by setting PTX 104-2 to "High." Afterwards, similar to the first row, after the signal of the pixel unit 100 of the second row is output to the output line 105, drive signal PRESA 101-2 and drive signal PRESB 201-1 are set to be "High" to reset the voltage of the input node 12.

After that, the similar operation is performed in the pixel units 100 included the third and subsequent rows. Moreover, in the above-mentioned description, although a description has been given using the operation of the pixel units 100 of the first and second columns as an example, the similar operation is performed in the pixel units 100 of odd-numbered columns and even-numbered columns.

By the above operation, it is possible to realize the first reading mode to output signals of a plurality of pixel units in parallel at every row. To be more specific, when the connection unit blocks the electric connection of the plurality of input nodes 12, a signal from the first pixel unit 100-11 is output to the first output line 105-1 and a signal from the second pixel unit 100-21 is output to the second output line 105-2.

The timing chart illustrated in FIG. 3 corresponds to the operation of the second reading mode. In the second reading mode, when the connection unit mutually connects the input nodes 12 of the plurality of pixel units 100 enclosed with one dotted line 200, a signal is selectively output to part of the plurality of output lines 105. In the second reading mode, an electric carrier transferred by the transfer transistor 11 is added in the input node 12. That is, an addition signal acquired by adding signals of the plurality of pixel units 100 is output.

Drive signal PSELA 102-1 in FIG. 3 is supplied to the selection transistor 16 of the pixel unit 100 arranged in the even-numbered columns of the first row. Meanwhile, drive signal PSELA 102-3 is supplied to the selection transistor 16 of the pixel unit 100 arranged in the odd-numbered columns of the first row.

Drive signal PSELA 102-1 and drive signal PSELA 102-3 are set to "High." By this means, the selection transistors 16-21 and 16-13 are turned on. At this time, drive signal PSELB 103-1 and drive signal PSELB 103-1 are "Low."

Therefore, the selection transistors 16-11, 16-12, 16-22, 16-23, 16-14 and 16-24 are turned off.

Next, drive signal PRESB 201-1 and drive signal PRESB 201-2 are set to "Low." By this means, reset transistors 15-11 and 15-12 are turned off. Since the electric connection between wiring VRES that supplies a power source voltage for reset and the input node 12 is disconnected, the input node 12 is released from the reset state.

Next, an electric carrier of the photoelectric conversion unit 10 is transferred by setting drive signals PTX 104-1, PTX 104-2, PTX 104-3 and PTX 104-4 to "High." At this time, sine the connection transistor 14 is turned on, the transferred electric carrier is added.

Among four selection transistors 16 corresponding to four pixel units 100 enclosed with the dotted line 200-11, the selection transistor 16-21 is turned on and the other selection transistors 16 are turned off. Therefore, signals from four pixel units 100 enclosed with the dotted line 200-11 are output to the output line 105-2. The output of the signals from these pixel units 100 to the output line 105-1 is blocked.

Among four selection transistors 16 corresponding to four pixel units 100 enclosed with the dotted line 200-12, the selection transistor 16-13 is turned on and the other selection transistors 16 are turned off. Therefore, signals from four pixel units 100 enclosed with the dotted line 200-12 are output to the output line 105-1. The output of the signals from these pixel units 100 to the output line 105-2 is blocked.

After a signal of the output line 105 is transmitted to a subsequent column circuit, the voltage of the input node 12 is reset similar to the first mode. Afterwards, a signal from the pixel unit of the next row is read out. Moreover, in the above description, although a description has been given using the operation of the pixel units 100 of the first and second rows, the similar operation is performed in the pixel units 100 of the odd-numbered rows and the even-numbered columns.

By the above operation, it is possible to realize the second reading mode to selectively output a signal acquired by adding signals of a plurality of pixel units to part of a plurality of output lines. To be more specific, when the connection unit mutually and electrically connects the plurality of input nodes 12, signals from four pixel units 100 enclosed with the dotted line 200-11 are output to the output line 105-2 and the output of the signals to the output line 105-1 is blocked.

Moreover, at this time, a signal from the pixel unit 100 different from four pixel units 100 enclosed with the dotted line 200-11 is output to the output line 105-1. That is, in a case where signals are added in the combination of two rows and two columns, two addition signals are read out in parallel.

As described above, in some embodiments, when the connection unit mutually connects the plurality of input nodes 12, the control unit selectively outputs a signal to one of the first output line 105-1 and the second output line 105-2. Thus, according to such embodiments, since it is possible to read out signals in parallel, signals can be read out at high speed. Alternatively, according to such a configuration, it is possible to reduce the power consumption since a signal is not output to the remaining output lines.

Embodiment 2

Another embodiment is described below. The difference from Embodiment 1 is that a pixel unit includes two photoelectric conversion units. That is, the pixel unit includes two pixels. Therefore, only the difference from Embodiment 1 is described, and description of the similar parts to Embodiment 1 will not be repeated.

Figure 4A:
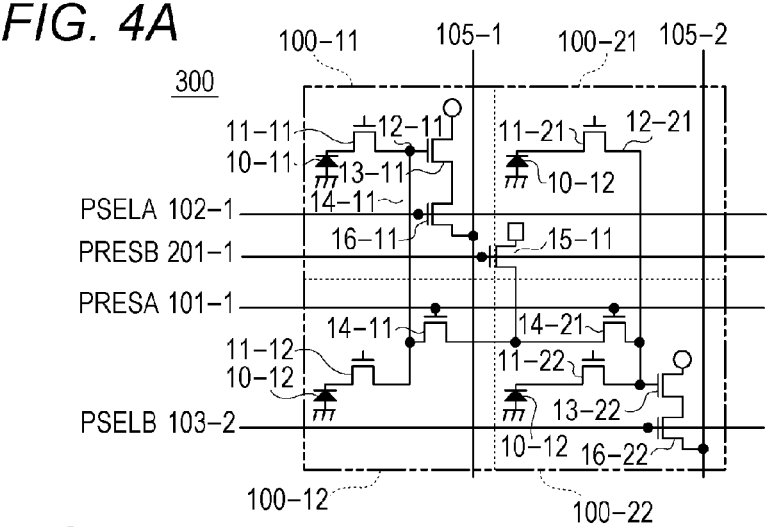
FIG. 4A is a view illustrating an equivalent circuit of an image pickup apparatus of an embodiment.

FIG. 4A is a view illustrating an equivalent circuit of an image pickup apparatus of some embodiments. The same reference numerals are assigned to the components same as FIG. 1 and the detailed description will not be repeated.

A first pixel unit 300-1 includes the photoelectric conversion unit 10-11, the photoelectric conversion unit 10-12 and the amplification transistor 13-11. The first pixel unit includes transfer transistors 11- and 11-12 respectively corresponding to the photoelectric conversion units 10-11 and 10-12. The photoelectric conversion unit 10-11 is electrically connected to the input node 12-11 of the amplification transistor 13-11 through the transfer transistor 11-11. The photoelectric conversion unit 10-12 is electrically connected to the input node 12-11 of the amplification transistor 13-11 through the transfer transistor 11-12. An electric carrier generated by the photoelectric conversion unit 10-11 and an electric carrier generated by the photoelectric conversion unit 10-12 may be added in the input node 12-11 at the timing at which two transfer transistors 11-11 and 11-12 are turned on.

An output node of the amplification transistor 13-11 is electrically connected to the output line 105-1 through the selection transistor 16-11. By turning on the selection transistor 16-11, it outputs a signal from the corresponding amplification transistor 13-11 to the output line 105-1. Moreover, by turning off the selection transistor 16-11, it blocks the output of signals from the corresponding amplification transistor 13-11 to the output line 105-1.

A second pixel unit 300-2 includes the photoelectric conversion unit 10-21, a photoelectric conversion unit 10-22 and an amplification transistor 13-22. The second pixel unit includes transfer transistors 11-21 and 11-22 respectively corresponding to the photoelectric conversion units 10-21 and 10-22. The photoelectric conversion unit 10-21 is electrically connected to the input node 12-21 of the amplification transistor 13-22 through the transfer transistor 11-21. The photoelectric conversion unit 10-22 is electrically connected to the input node 12-21 of the amplification transistor 13-22 through the transfer transistor 11-22. An electric carrier generated by the photoelectric conversion unit 10-21 and an electric carrier generated by the photoelectric conversion unit 10-22 may be added in the input node 12-21 at the timing at which two transfer transistors 11-21 and 11-22 are turned on.

An output node of the amplification transistor 13-22 is electrically connected to the output line 105-2 through the selection transistor 16-22. By turning on the selection transistor 16-22, it outputs a signal from the corresponding amplification transistor 13-22 to the output line 105-2. Moreover, by turning off the selection transistor 16-22, it blocks the output of signals from the corresponding amplification transistor 13-22 to the output line 105-2.

The connection transistor 14-11 is arranged corresponding to the first pixel unit 300-1. The connection transistor 14-21 is arranged corresponding to the second pixel unit 300-2. The electric connection between the input node 12-11 of the amplification transistor 13-11 included in the first pixel unit 300-1 and the input node 12-21 of the amplification transistor 13-22 included in the second pixel unit 300-2 is controlled by these connection transistors 14-11 and 14-21. The connection transistor 14 is included in a connection unit. In FIG. 4A, a dotted line 400 shows the combination of a plurality of pixel units 300 that are mutually connected by the connection unit.

In the embodiment illustrated in FIG. 4A, a control node of the selection transistor 16-11 and a control node of the selection transistor 16-22 are connected to different control lines. That is, the selection transistor 16-11 and the selection transistor 16-22 are controlled independently from each other. With such a configuration, when the connection unit connects the input node 12-11 of the amplification transistor 13-11 and the input node 12-21 of the amplification transistor 13-22, the control unit selectively outputs a signal to either one of the output line 105-1 and the output line 105-2.

In these embodiments, two photoelectric conversion units 10 share one amplification transistor 13. Therefore, it is possible to reduce the number of transistors arranged per one pixel. As a result, it is possible to enlarge the apertures of the photoelectric conversion units 10 in these embodiments.

Figure 4B:
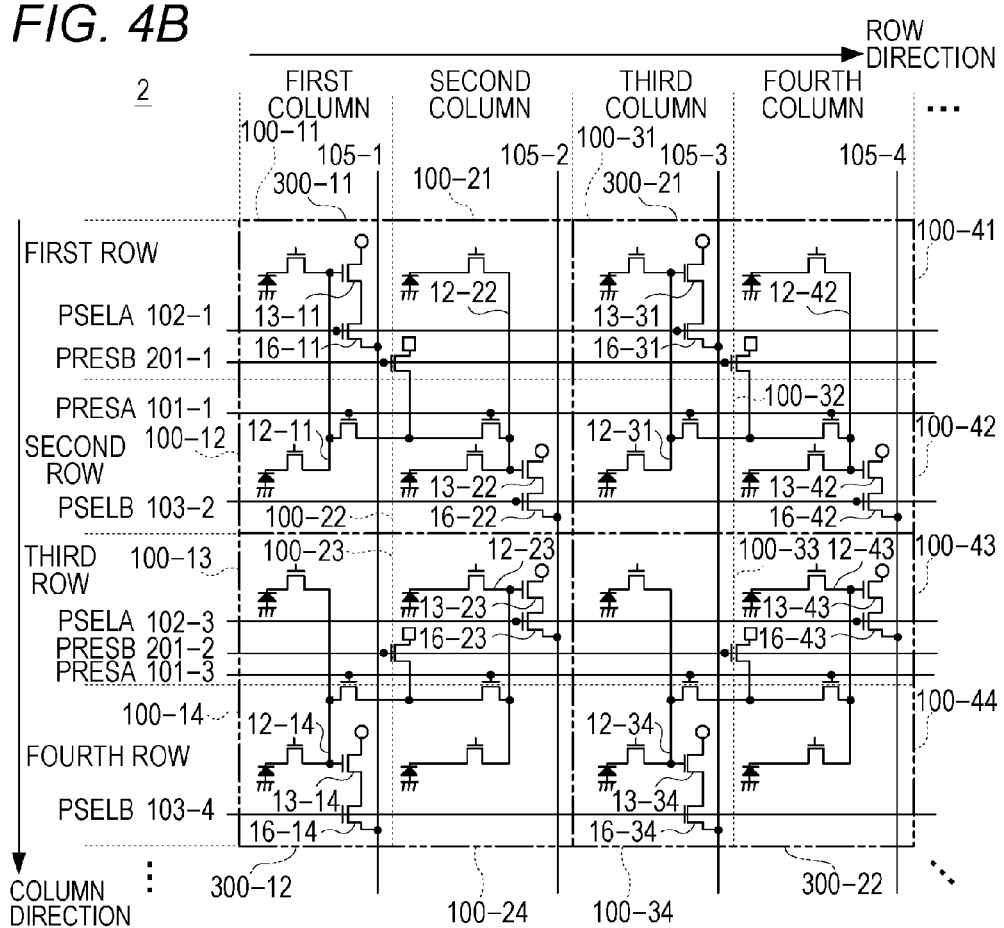
FIG. 4B illustrates an equivalent circuit of an embodiment having the equivalent circuit illustrated in FIG. 4A.

Also, FIG. 4B illustrates an equivalent circuit of an embodiment in which a pixel unit 300 having the equivalent circuit illustrated in FIG. 4A is arranged in a 2-row, 4-column matrix. In these embodiments, a signal from another pixel unit can be output to the output line 105 in which the output of signals is blocked. As a result, it is possible to read out signals at high speed in these embodiments. In FIG. 4B, the dotted line 400 shows the combination of the plurality of pixel units 300 that are mutually connected by the connection unit.

Figure 5:
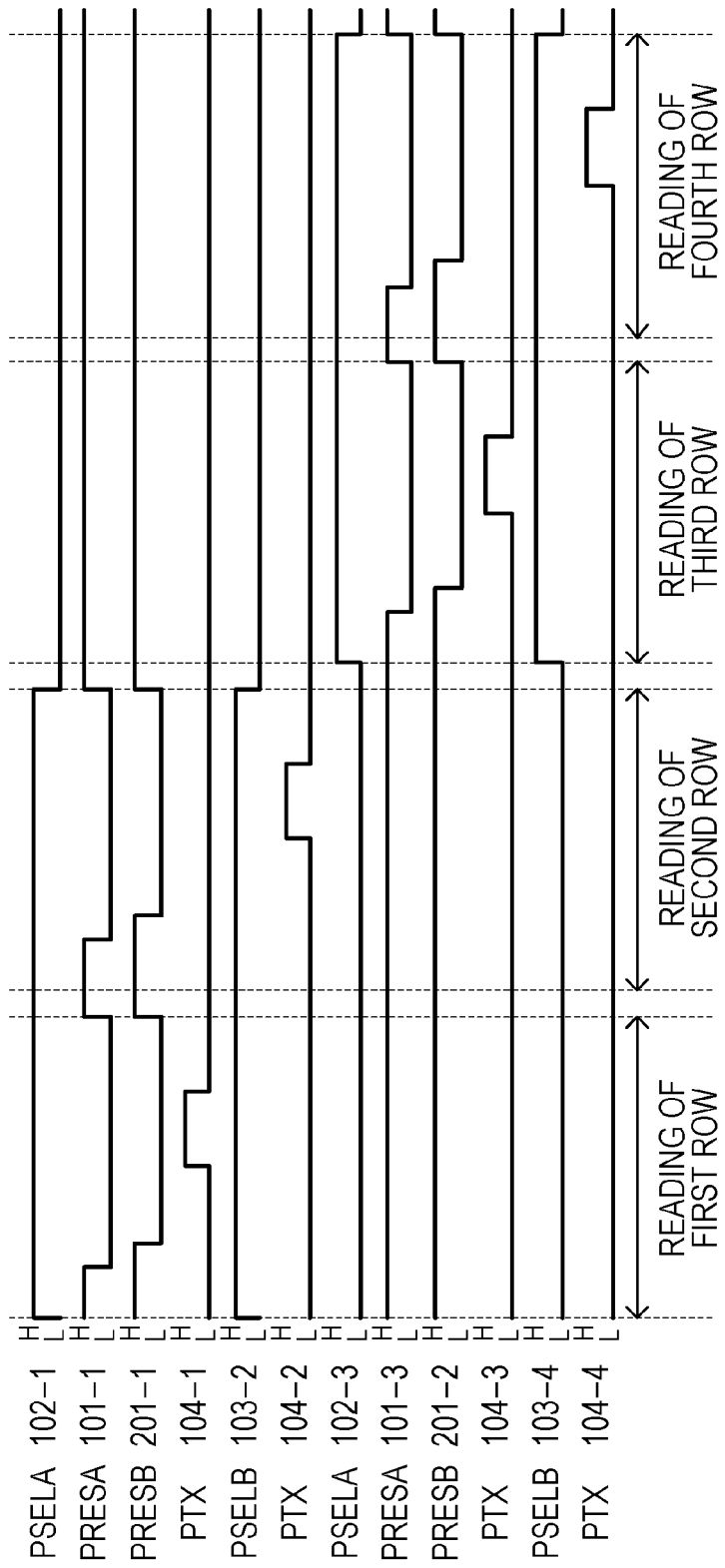
FIG. 5 is a timing chart diagram schematically illustrating the operation of an image pickup apparatus of an embodiment.
Figure 6:
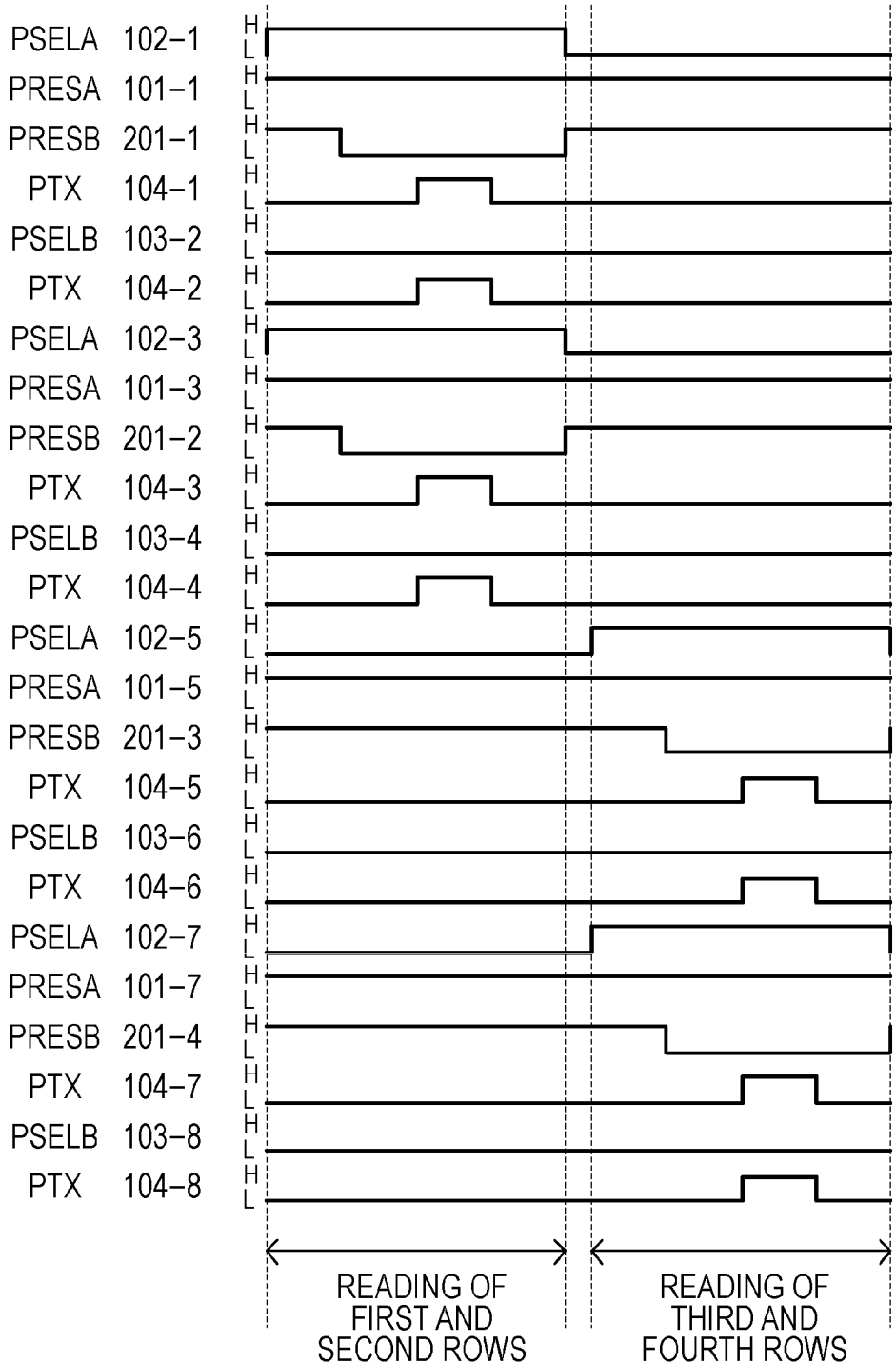
FIG. 6 is a timing chart diagram schematically illustrating the operation of an image pickup apparatus of an embodiment.

An embodiment of a driving method of the image pickup apparatus is described below. FIGS. 5 and 6 are views schematically illustrating a timing chart of drive signals. The drive signals illustrated in FIG. 5 or FIG. 6 are supplied to control lines to which the same reference numerals are assigned in the image pickup apparatus of the embodiment illustrated in FIG. 4. Drive signal PTX 104-1 is supplied to a control line connected to transfer transistors 11-11, 11-21, 11-31 and 11-41. Drive signal PTX 104-2 is supplied to a control line connected to transfer transistors 11-12, 11-22, 11-32 and 11-42. Drive signal PTX 104-3 is supplied to a control line connected to transfer transistors 11-13, 11-23, 11-33 and 11-43. Drive signal PTX 104-4 is supplied to a control line connected to transfer transistors 11-14, 11-24, 11-34 and 11-44. When a drive signal is "High," a relevant transistor is turned on. When a drive signal is "Low," a relevant transistor is turned off. Moreover, a scanning circuit that is not illustrated may supply these drive signals.

The timing chart illustrated in FIG. 5 corresponds to the operation of the first reading mode. The selection transistors 16-11, 16-22, 16-31 and 16-42 are turned on by setting drive signal PSELA 102-1 and drive signal PSELB-2 to "High."

Next, drive signal PRESA 101-1 and drive signal PRESB 201-1 are set to "Low" in order. By this means, the connection transistors 14-12 and 14-22 and the reset transistor 15-11 are turned off. Further, input nodes 12-11, 12-22, 12-31 and 12-42 are released by the reset state.

Next, drive signal PTX 104-1 supplied to a control line connected to the transfer transistor 11 is set to "High." By this means, an electric carrier of the photoelectric conversion unit 10 of the first row is transferred to the corresponding input node 12. The photoelectric conversion unit of the first row denotes, for example, the photoelectric conversion unit 10-11 out of two photoelectric conversion units 10-11 and 10-21 included in the pixel unit 300-1.

Amplification transistors 13-11, 13-22, 13-13 and 13-42 output signals based on the transferred electric carriers to the corresponding output line 105. After the signals are transmitted to a subsequent column circuit, drive signal PRESA 101-1 and drive signal PRESB 201-1 are set to "High." By this means, the voltage of the input node 12 is reset.

Subsequently, by setting drive signal PRESA 101-1 and drive signal PRESB 201-1 to "Low" in order, the input nodes 12-11, 12-22, 12-31 and 12-42 are released from the reset state. Next, by setting drive signal PTX 104-2 to "High," an electric carrier of the photoelectric conversion unit 10 of the second row is transferred to the input node 12. The photoelectric conversion unit of the second row refers to, for example, the photoelectric conversion unit 10-12 out of two photoelectric conversion units 10-11 and 10-12 included in a pixel unit 300-11.

Similar to the operation in the first row, the amplification transistors 13-11, 13-22, 13-13 and 13-42 output signals based on the transferred electric carriers to the corresponding output line 105. After the signals are transmitted to a subsequent column circuit, drive signal PRESA 101-1 and drive signal PRESB 201-1 are set to be "High." By this means, the voltage of the input node 12 is reset.

By the above operation, it is possible to realize the first reading mode to output signals of a plurality of pixel units in parallel at every row. To be more specific, when the connection unit blocks the electric connection of the plurality of input nodes 12, a signal from the first pixel unit 300-11 is output to the first output line 105-1 and a signal from the second pixel unit 300-21 is output to the second output line 105-2.

Here, the electric carriers transferred by the transfer transistor 11 may be added in the input node 12. That is, the electric carriers of the plurality of photoelectric conversion units included in a pixel unit 300 may be added.

The timing chart illustrated in FIG. 6 corresponds to the operation of the second reading mode. In the second reading mode, when the connection unit mutually connects the input nodes 12 of a plurality of pixel units 300 enclosed within a dotted line 400, a signal is selectively output to either one of the plurality of output lines 105-1 and 105-2.

The electric carriers transferred by the transfer transistor 11 may be added in the input nodes 12. That is, a signal acquired by adding the signals of the plurality of pixel units 100 may be output. For example, by setting drive signal PRESA 101 to "High," the electric carriers read from the photoelectric conversion unit 10 through the transfer transistor 11 are added in pixel units enclosed with a dotted line 400-11. Further, by setting either one of drive signal PSELA 102-1 and drive signal PSELB 103-2 to "High," a signal is selectively output to the corresponding output line 105.

Thus, it is possible to realize the second reading mode in which a signal acquired by adding signals of a plurality of pixel units is selectively output to part of a plurality of output lines.

As described above, in some embodiments, when the connection unit mutually connects the plurality of input nodes 12, the control unit selectively outputs a signal to one of the first output line 105-1 and the second output line 105-2. According to such embodiments, since it is possible to read out signals in parallel, signals can be read out at high speed. Alternatively, according to such a configuration, it is possible to reduce the power consumption since a signal is not output to the remaining output lines.

Moreover, in some embodiments, two photoelectric conversion units share an amplification transistor in a pixel unit. With such a configuration, it is possible to reduce the number of transistors. As a result, in these embodiments, it is possible to enlarge the apertures of the photoelectric conversion units.

Embodiment 3

Figure 7:
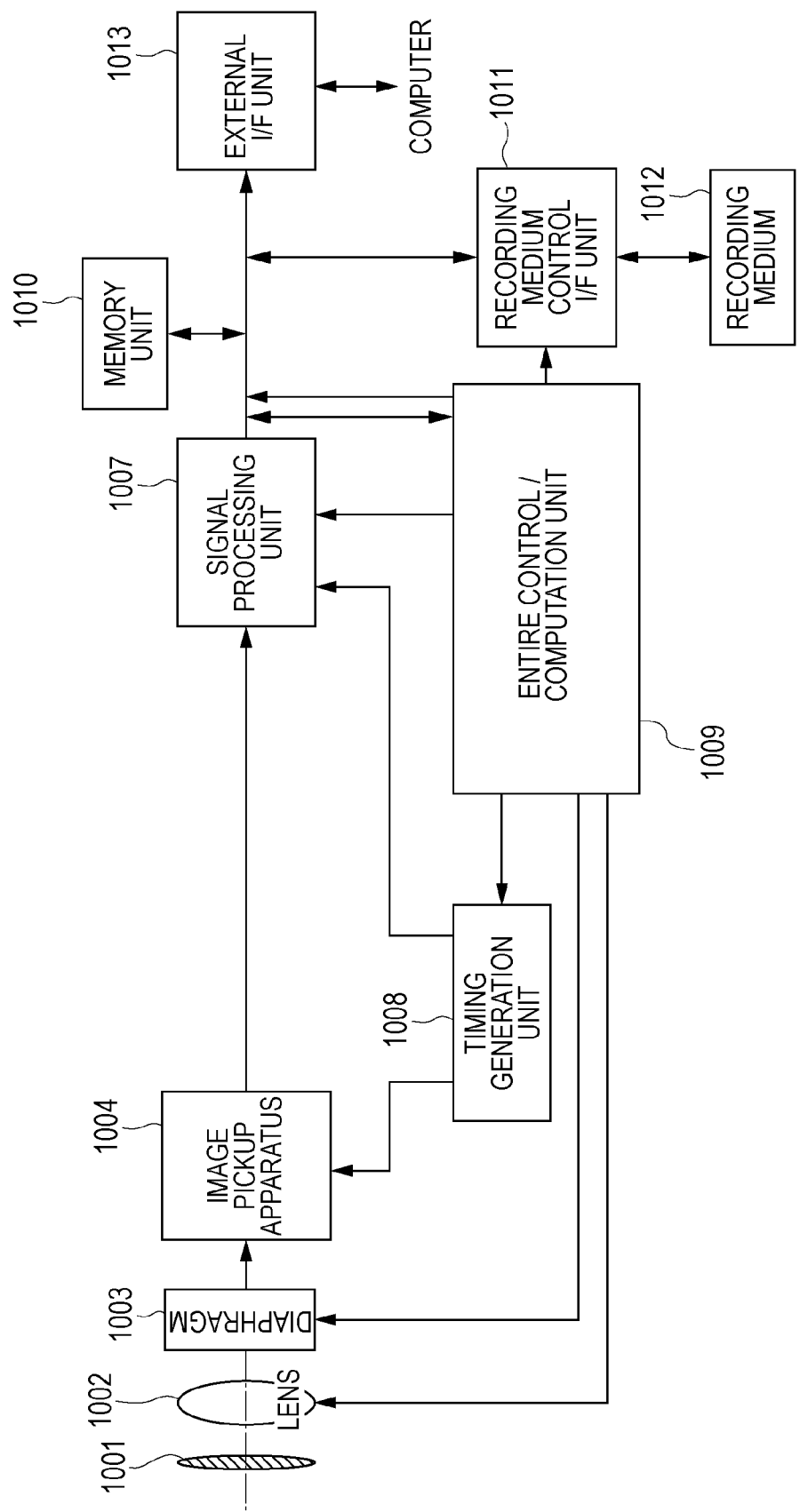
FIG. 7 is a block diagram of an embodiment of an image pickup system.

An embodiment of an image pickup system is described below. Examples of the image pickup system include a digital still camera, a digital camcorder, a copier, a fax, a mobile phone, a car-mounted camera and an observation satellite. FIG. 7 illustrates a block diagram of a digital still camera as an example of the image pickup system.

As illustrated in FIG. 7, a reference numeral "1001" represents a barrier for lens protection, a reference numeral "1002" represents a lens that forms an optical image of an object in an image pickup apparatus 1004, and a reference numeral "1003" represents a diaphragm to change the amount of light passing through the lens 1002. The reference numeral "1004" represents an image pickup apparatus that is described in the above-mentioned embodiments and that converts the optical image formed by the lens 1002 into image data. Here, it is assumed that an AD conversion unit is formed in a semiconductor substrate of the image pickup apparatus 1004. A reference numeral "1007" represents a signal processing unit that compresses various kinds of correction or data in image pickup data output from the image pickup apparatus 1004. Moreover, in FIG. 7, a reference numeral "1008" represents a timing generation unit that outputs various kinds of timing signals to the image pickup apparatus 1004 and the signal processing unit 1007, and a reference numeral "1009" represents an entire control unit that controls the entire digital still camera. A reference numeral "1010" represents a frame memory unit to temporarily store image data, a reference numeral "1011" represents an interface unit to perform recording or reading in a recording medium, and a reference numeral "1012" represents a detachably-mounted recording medium, such as a semiconductor memory, to record or read out image pickup data. A reference numeral "1013" represents an interface unit to perform communication with an external computer or the like. Here, a timing signal or the like may be input from the outside of the image pickup apparatus The image pickup system only has to have at least the image pickup apparatus 1004 and the signal processing unit 1007 that processes an image pickup signal output from the image pickup apparatus 1004.

In this embodiment, a configuration has been described in which the image pickup apparatus 1004 and the AD conversion unit are formed in the same semiconductor substrate. However, the image pickup apparatus 1004 and the AD conversion unit may be installed in different semiconductor substrates. Moreover, the image pickup apparatus 1004 and the signal processing unit 1007 may be formed in the same semiconductor substrate.

In the embodiment of the image pickup system, the image pickup apparatus of Embodiment 1 or Embodiment 2 is used for the image pickup apparatus 1004. Thus, it is possible to read out signals at high speed by applying the embodiment in the image pickup system.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2013-001081, filed Jan. 8, 2013, which is hereby incorporated by reference herein in its entirety.

What is claimed is:

1. An image pickup apparatus comprising:
   a plurality of pixel units each configured to include a photoelectric conversion unit and an amplification transistor that outputs a signal based on an electric carrier generated by the photoelectric conversion unit, and be arranged in a matrix manner;
   a first output line to which a signal from two or more pixel units arranged in a first column, including a first pixel unit, among the plurality of pixel units is output;
   a second output line to which a signal from two or more pixel units arranged in a second column, including a second pixel unit, among the plurality of pixel units is output;

a connection unit configured to control an electric connection between an input node of the amplification transistor included in the first pixel unit and an input node of the amplification transistor included in the second pixel unit;

a first selection transistor connected in series to the amplification transistor included in the first pixel unit; and a second selection transistor connected in series to the amplification transistor included in the second pixel unit, wherein:

the first pixel unit and the second pixel unit are arranged in a same row; and the first selection transistor and the second selection transistor are controlled independently from each other.

2. The image pickup apparatus according to claim 1, wherein a signal from at least one of the first pixel unit and the second pixel unit is output to the first output line out of the first output line and the second output line, in a case where the connection unit mutually connects the input node of the amplification transistor included in the first pixel unit and the input node of the amplification transistor included in the second pixel unit.

3. The image pickup apparatus according to claim 1, wherein the plurality of pixel units includes a third pixel unit and a fourth pixel unit, a signal from the third pixel unit is output to the first output line, a signal from the fourth pixel unit is output to the second output line, the connection unit is configured to control an electric connection between an input node of the amplification transistor included in the third pixel unit and an input node of the amplification transistor included in the fourth pixel unit, and in a case where the connection unit mutually connects the input node of the amplification transistor included in the first pixel unit and the input node of the amplification transistor included in second pixel unit and mutually connects the input node of the amplification transistor included in the third pixel unit and the input node of the amplification transistor included in fourth pixel unit, a signal from at least one of the first pixel unit and the second pixel unit is output to the first output line and a signal from at least one of the third pixel unit and the fourth pixel unit is output to the second output line.

4. The image pickup apparatus according to claim 3, further comprising:

a third selection transistor connected in series to the amplification transistor included in the third pixel unit; and a fourth selection transistor connected in series to the amplification transistor included in the fourth pixel unit, wherein the third selection transistor and the fourth selection transistor are controlled independently from each other.

5. The image pickup apparatus according to claim 1, wherein the plurality of pixel units includes a fifth pixel unit and a sixth pixel unit, the amplification transistor included in the fifth pixel unit is electrically connected to the first output line, the amplification transistor included in the sixth pixel unit is electrically connected to the second output line, and the connection unit mutually and electrically connects input nodes of the amplification transistors included in the first, the second, the fifth and the sixth pixel units.

6. The image pickup apparatus according to claim 5, further comprising:

a fifth selection transistor connected in series to the amplification transistor included in the fifth pixel unit; and a sixth selection transistor connected in series to the amplification transistor included in the sixth pixel unit, wherein the fifth selection transistor and the sixth selection transistor are electrically connected to a common control line.

7. The image pickup apparatus according to claim 5, further comprising:

a fifth selection transistor connected in series to the amplification transistor included in the fifth pixel unit, and a sixth selection transistor connected in series to the amplification transistor included in the sixth pixel unit, wherein the fifth selection transistor and the sixth selection transistor are electrically connected to different control lines.

8. The image pickup apparatus according to claim 1, wherein each of the plurality of pixel units includes a second photoelectric conversion unit different from the photoelectric conversion unit, and the amplification transistor in each of the plurality of pixel units is configured to output a signal based on an electric carrier of the second photoelectric conversion unit.

9. The image pickup apparatus according to claim 1, wherein the connection unit includes a first connection transistor and a second connection transistor, one node of the first connection transistor is electrically connected to the input node of the amplification transistor included in the first pixel unit, one node of the second connection transistor is electrically connected to the input node of the amplification transistor included in the second pixel unit, and a different node of the first connection transistor and a different node of the second selection transistor are electrically connected, through a reset transistor, to a node that supplies a voltage for reset.

10. The image pickup apparatus according to claim 1, wherein, in a case where the connection unit mutually connects the input node of the amplification transistor included in the first pixel unit and the input node of the amplification transistor included in the second pixel unit, a signal from at least one of the first pixel unit and the second pixel unit is output to the first output line, and an output of a signal from the first pixel unit or the second pixel unit to the second output line is blocked.

11. The image pickup apparatus according to claim 1, wherein, in a case where the connection unit mutually connects the input node of the amplification transistor included in the first pixel unit and the input node of the amplification transistor included in the second pixel unit, a signal from the first pixel unit or the second pixel unit is output to the first output line.

12. An image pickup system comprising:

an image pickup apparatus according to claim 1; and a signal processing apparatus configured to process a signal output from the image pickup apparatus.

* * * * *